(12) United States Patent
Ishii (10) Patent No.: US 7,710,607 B2
(45) Date of Patent: May 4, 2010

(54) IMAGE PROCESSING METHOD AND APPARATUS

(75) Inventor: Masatoshi Ishii, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 413 days.

(21) Appl. No.: 11/682,539

(22) Filed: Mar. 6, 2007

(65) Prior Publication Data

US 2007/0211298 A1  Sep. 13, 2007

(30) Foreign Application Priority Data

Mar. 8, 2006  (JP)  ............................. 2006-063145

(51) Int. Cl.
- G06K 15/00  (2006.01)
- G06K 9/00   (2006.01)
- G03F 3/08   (2006.01)

(52) U.S. Cl. ................ 358/3.23; 358/523; 358/522; 382/166

(58) Field of Classification Search .............. 358/1.9, 358/3.23, 518, 520, 523, 524, 525, 539, 522, 358/530; 382/162, 165, 167, 170, 166, 232
See application file for complete search history.

(56) References Cited

U.S. PATENT DOCUMENTS

| | | | | |
|---|---|---|---|---|
| 6,320,676 B1 * | 11/2001 | Yoshidome | .................. | 358/1.9 |
| 6,650,771 B1 * | 11/2003 | Walker | ....................... | 382/162 |
| 2002/0029715 A1 * | 3/2002 | Ogatsu et al. | ................ | 101/494 |
| 2002/0047848 A1 * | 4/2002 | Odagiri et al. | ............... | 345/581 |
| 2003/0031375 A1 * | 2/2003 | Enomoto | ..................... | 382/255 |
| 2003/0053085 A1 * | 3/2003 | Takemoto | .................... | 358/1.9 |
| 2004/0036898 A1 * | 2/2004 | Takahashi | .................... | 358/1.9 |
| 2005/0264836 A1 * | 12/2005 | Gotoh et al. | .................. | 358/1.9 |
| 2005/0280848 A1 * | 12/2005 | Seko | ........................... | 358/1.9 |
| 2009/0046179 A1 * | 2/2009 | Aoyama et al. | .............. | 348/241 |

FOREIGN PATENT DOCUMENTS

JP  2002-015314  1/2002

* cited by examiner

Primary Examiner—Madeleine A Nguyen
(74) Attorney, Agent, or Firm—Cowan, Liebowitz & Latman, P.C.

(57) ABSTRACT

The generation of an N-dimension look-up table used ($N \geq 2$) in conversion processing of input image data includes acquiring a value of the input image data for every channel corresponding to a respective dimension of the N-dimension look-up table by analyzing the input image data to be processed, determining an input value range of each dimension of the N-dimension look-up table based upon the acquired value, arranging a predetermined number of grid points in the determined input value range with regard to each dimension of the N-dimension look-up table, and setting an output value of each arranged grid point based upon desired image conversion processing.

11 Claims, 10 Drawing Sheets

IMAGE PROCESSING METHOD AND APPARATUS

BACKGROUND OF THE INVENTION

1. Field of the Invention

The present invention relates to image processing utilizing a look-up table.

2. Description of the Related Art

An image sensing apparatus such as a digital still camera converts an electric signal, which represents a captured image obtained through opto-electronic conversion of the optical image of a subject by an image sensing device such as a CMOS or CCD, to digital data and records the digital data on a storage medium such as a memory card. The recorded digital data is read by a computer or the like and can be output by an output device such as a monitor.

A digital image captured by a digital still camera can readily be manipulated into an image having a color reproducibility desired by the user by having the user specify such parameter adjustment quantities as a tone curve, tint and color density and then applying image processing using a computer. Generally, when such image processing is executed, each pixel value of the input digital image is subjected to processing for successively adjusting the tone curve, tint and color density, etc., whereby the desired output image is obtained.

In order to raise the speed of processing in a system in which processing from the deciding of the parameter adjustment quantities to the outputting of the image is executed in dialog fashion, use is made of a three-dimensional look-up table (referred to as a "3D-LUT" below). More specifically, in addition to applying a tone curve correction and adjusting tint and color density, use is made of a method in which image processing inclusive of color matching is incorporated in a single 3D-LUT and the desired output image is obtained by referring to the 3D-LUT based upon each of the pixel values of the input digital image data.

The processing for incorporating image processing in a 3D-LUT includes the following:

(1) preparing a 3D-LUT that has been initialized in such a manner that an input value is output as is as an output value of the 3D-LUT; and (2) successively applying a plurality of image processes to output values at grid points of the initialized 3D-LUT to thereby correct the output value of each of the grid points.

This makes it possible to create a 3D-LUT for a color conversion in which a value prior to application of image processing is adopted as an input value and a value after the application of a plurality of image processes is adopted as an output value.

If the number of grid points is made the same as the number of bits of the image data in the 3D-LUT described above, the number of grid points will be enormous (e.g., $256^3$ grid points in the case of an 8-bit RGB image). As a consequence, the operation for generating the 3D-LUT requires a long period of time. This offsets the advantage of using the 3D-LUT. On the other hand, if the number of grid points in the 3D-LUT is made too small, there may be a decline in the precision with which interpolation is performed between grid points at the time of the conversion to image data. Accordingly, a variety of techniques have been adopted in regard to the setting of grid points in a 3D-LUT. The specification of Japanese Patent Application Laid-Open No. 2002-015314 proposes an arrangement in which the above-mentioned grid points are set in accordance with the number of bits of input image data. In accordance with Japanese Patent Application Laid-Open No. 2002-015314, a 3D-LUT comprising $(2n/8)+1$ grid points of each color is generated in a case where the input image is composed of n bits.

However, the method described above always generates a 3D-LUT having the full data range of the image, namely 8 bits or 16 bits, as input values regardless of the range over which the input image data actually possesses values, i.e., regardless of the value range. This leads to various problems, namely wasting of grid points of a 3D-LUT that exceeds the value range of the input image data, and a decline in the image quality of the output image data. For example, with regard to image data in which the data range that can be expressed by this number of bits is not used fully, as in the case of a dark image, grid points of a 3D-LUT that exceeds the value range of the input image data will be wasted and a decline in image quality resulting form interpolation processing tends to occur.

SUMMARY OF THE INVENTION

The present invention has been devised in view of the foregoing problems and sets the input value range of an N-dimension look-up table based upon the value range of input image data, thereby making possible the provision of an N-dimension look-up table that is capable of implementing a highly accurate conversion without an increase in memory size.

According to one aspect of the present invention, there is provided an information processing method for generating an N-dimension look-up table (N≧2) used in conversion processing of input image data, comprising: an acquiring step of acquiring a value of the input image data for every channel corresponding to a respective dimension of the N-dimension look-up table by analyzing the input image data to be processed; a determining step of determining an input value range of each dimension of the N-dimension look-up table based upon the value acquired at the acquiring step; an arranging step of arranging a predetermined number of grid points in the input value range determined at the determining step with regard to each dimension of the N-dimension look-up table; and a setting step of setting an output value of each grid point, which has been arranged at the arranging step, based upon image processing to be executed.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

System Description

Figure 1:
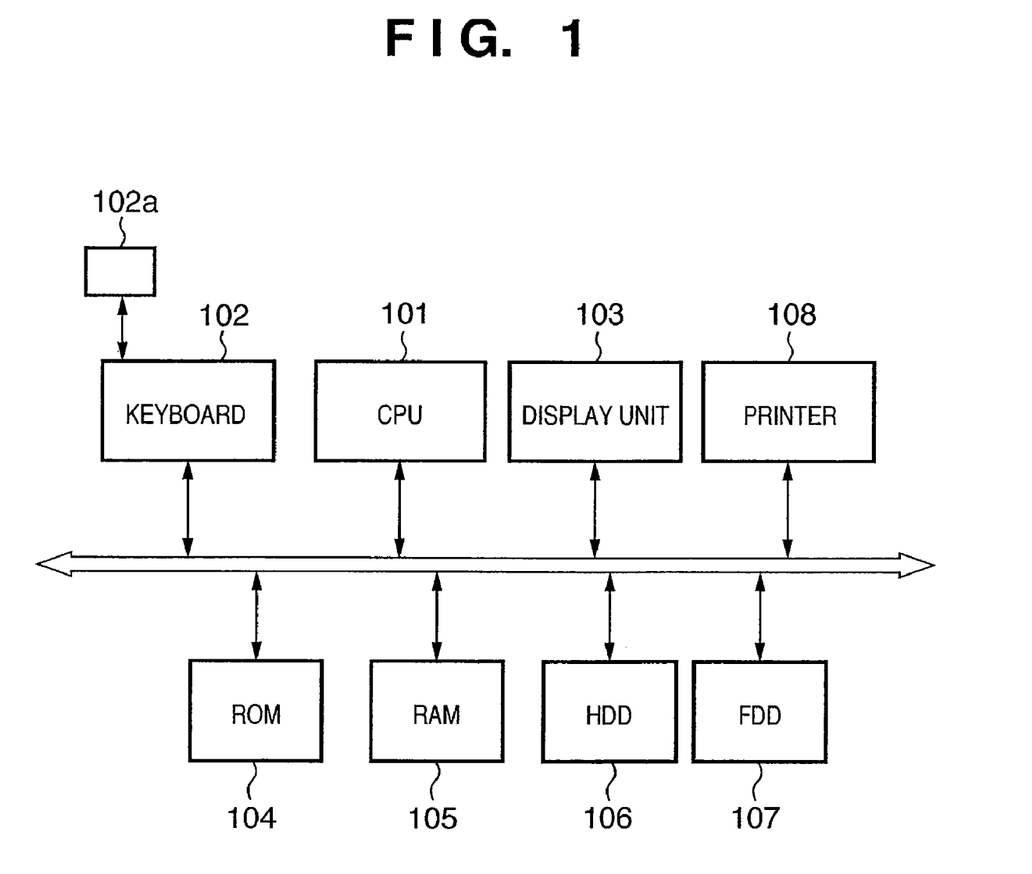
FIG. 1 is a block diagram illustrating the configuration of a computer system according to a first embodiment of the present invention.

FIG. 1 is a block diagram illustrating the configuration of a computer system capable of providing an N-dimension look-up table according to this embodiment. A CPU 101 in FIG. 1 controls the overall system. A keyboard 102 is used together with a pointing device in order to input user commands to the system. A display unit 103, which comprises a CRT or liquid crystal, presents various displays under the control of the CPU 101. A ROM 104 and a RAM 105 construct a storage device in the system and store programs executed by the system and data utilized by the system. A hard-disk drive 106 and a floppy (registered trademark)-disc drive 107 construct an external storage unit used for storing files of the system. A printer 108 is connected to the computer system of this embodiment. The configuration and processing of this embodiment will be described using a 3D-LUT conforming to RGB color space as an example of an N-dimension look-up table.

Figure 2:
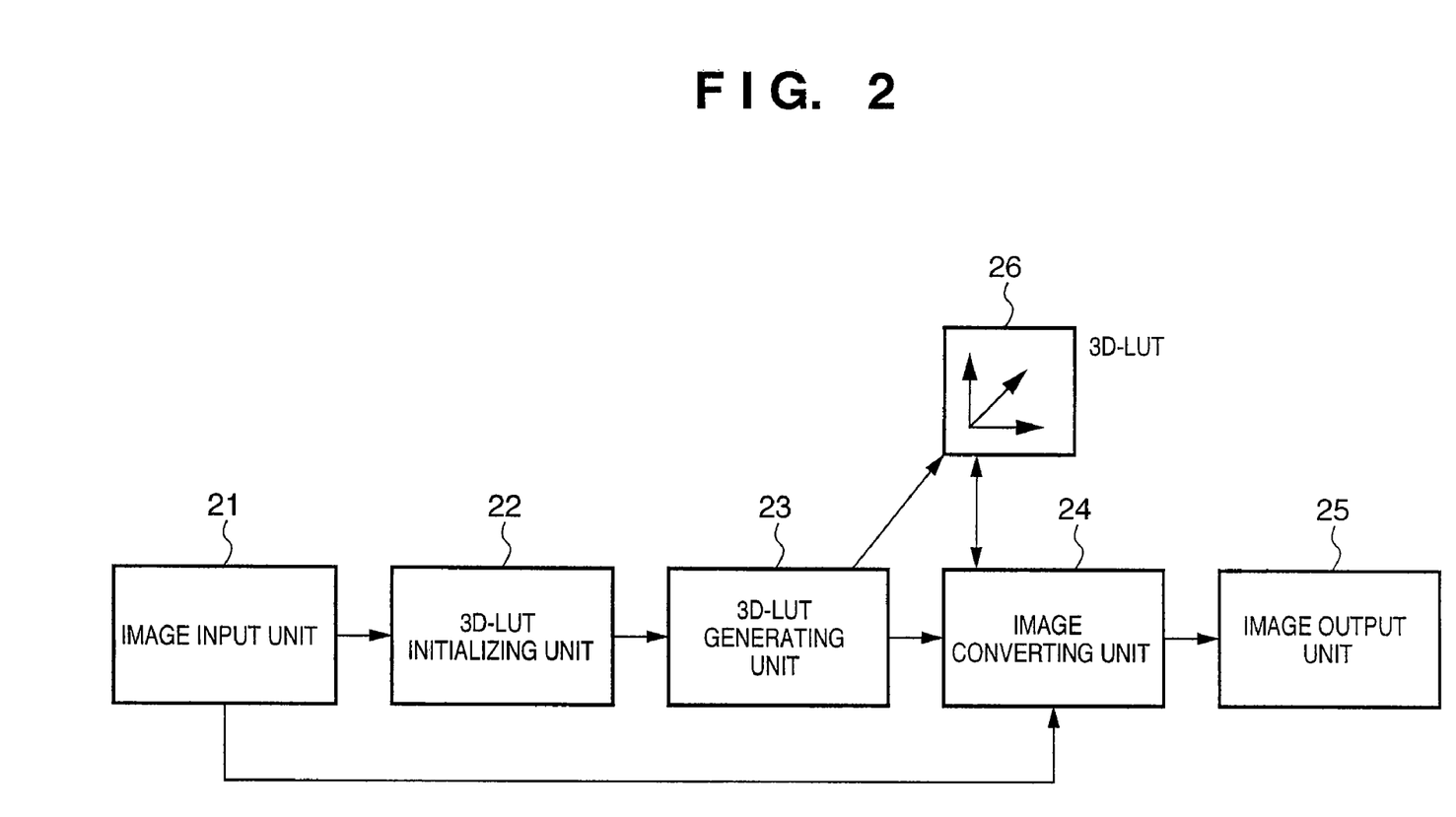
FIG. 2 is a block diagram illustrating an example of the functional configuration of image processing by a computer system.

FIG. 2 is a block diagram useful in describing the functional configuration of image processing by the computer system of this embodiment. The computer system according to this embodiment executes image processing using a 3D-LUT. It should be noted that the image processing described below is implemented by executing a control program that has been stored in the ROM 104 or a control program that has been loaded in the RAM 105. It may be so arranged that some of the functions of image processing are implemented by special-purpose hardware.

An image input unit 21 decodes image data, which has been stored on the hard-disk drive 106 (this data shall be referred to as "input image data" below), by a well-known method and stores a bitmap in the RAM 105. A 3D-LUT initializing unit 22 initializes the 3D-LUT by 3D-LUT initializing processing (described later) and creates an initial 3D-LUT. A 3D-LUT generating unit 23 incorporates one or a plurality of image processes (color conversion processing), executed in order to obtain a desired output image, in the initial 3D-LUT generated by the 3D-LUT initializing unit 22 and generates a color-conversion 3D-LUT 26 for performing a desired color conversion. Processing for incorporating the image processing in the 3D-LUT includes sequentially applying a plurality of image processes to the output values of each of the grid points of the initial 3D-LUT and modifying the outputs of each of the grid points. This makes it possible to generate the color-conversion 3D-LUT 26 in which a value prior to application of image processing is adopted as an input value and a value after the application of a plurality of image processes is adopted as an output value.

An image converting unit 24 looks up the color-conversion 3D-LUT 26, which has been generated by the 3D-LUT generating unit 23, based upon the input image data, thereby creating output image data that has undergone the desired color conversion. In looking up the color-conversion 3D-LUT 26, use is made of a well-known method that includes detecting eight corresponding neighboring grid points using higher-order bits of the input image data, and obtaining an output value by cubic interpolation using lower-order bits of the input image data. An image output unit 25 displays the output image data, which as been created by the image converting unit 24, on the display unit 103.

[Description of 3D-LUT Initializing Processing]

Figure 3:
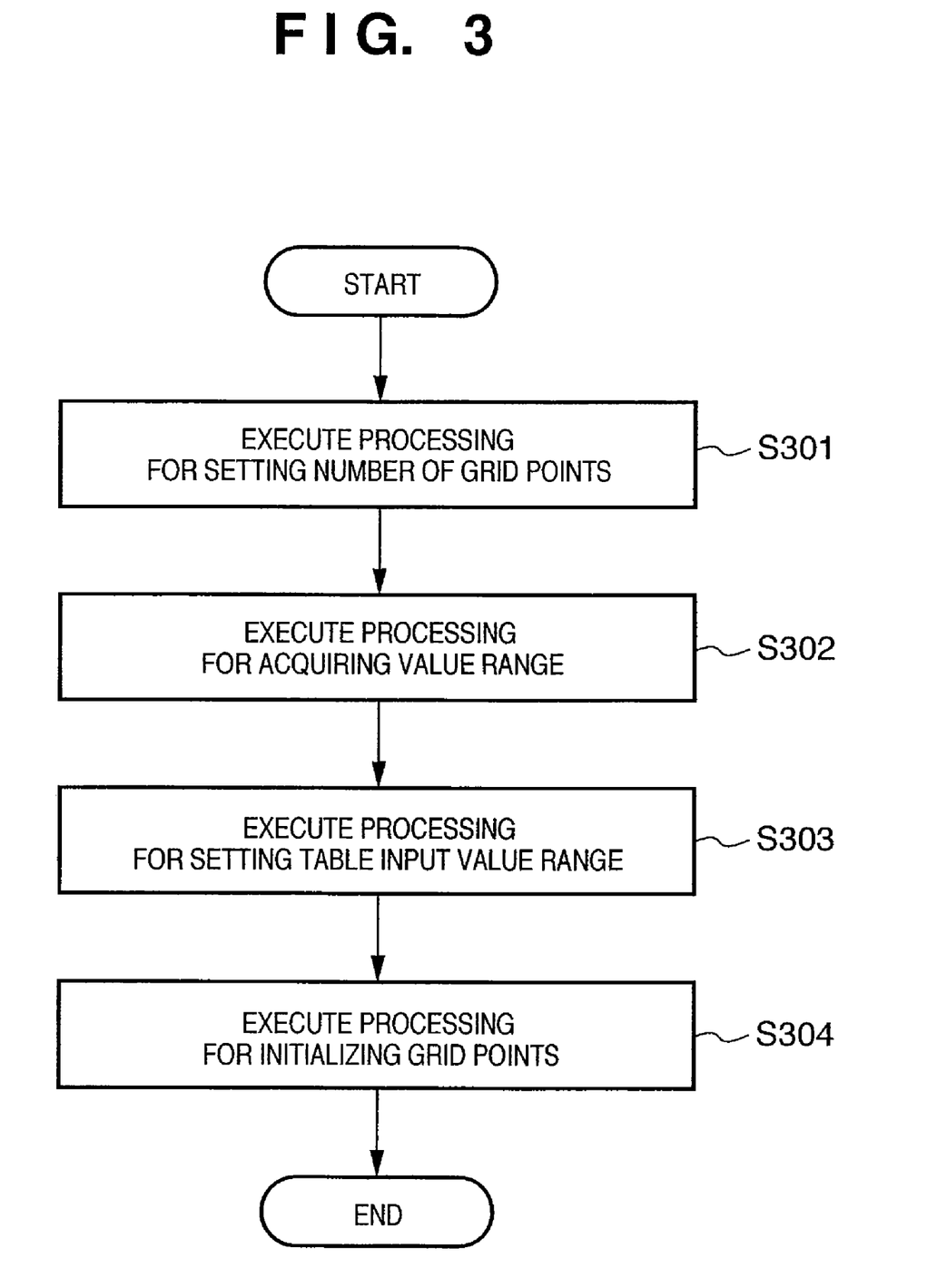
FIG. 3 is a flowchart useful in describing 3D-LUT initialization processing according to the first embodiment.

Processing for initializing a 3D-LUT by the 3D-LUT initializing unit 22 will be described in detail with reference to the flowchart shown in FIG. 3.

First, at step S301, the 3D-LUT initializing unit 22 sets the number N of grid points of each of the R, G, B channels of the 3D-LUT. The setting of the number N of grid points can be performed using a well-known method of the kind described in the specification of Japanese Patent Application Laid-Open No. 2002-015314 mentioned above. That is, the setting is made to, e.g., 9, 17 o4 33 taking into consideration calculation time for generating the 3D-LUT and accuracy of interpolation between grid points at the time of conversion of image data.

Next, at step S302, the 3D-LUT initializing unit 22 acquires the value range of the input image data by value-range acquisition processing, described later. Then, at step S303, the 3D-LUT initializing unit 22 sets the input value range of the 3D-LUT in accordance with processing for setting a table input value range, described later. Finally, at step S304, by way of grid-point initializing processing described later, the 3D-LUT initializing unit 22 initializes the output value of each grid point by the data of the input value range of the 3D-LUT that has been set by step S303, thereby generating an initial 3D-LUT.

The above-described processing is capable of generating a 3D-LUT that accepts only values within the value range of the input image data as input values. In other words, a 3D-LUT capable of implementing a highly precise conversion regarding input image data of interest can be generated without setting needless grid points. The processing for acquiring a value range, processing for setting a table input value range and grid-point initializing processing will now be described in succession.

<Description of Processing for Acquiring Value Range>

Figure 4:
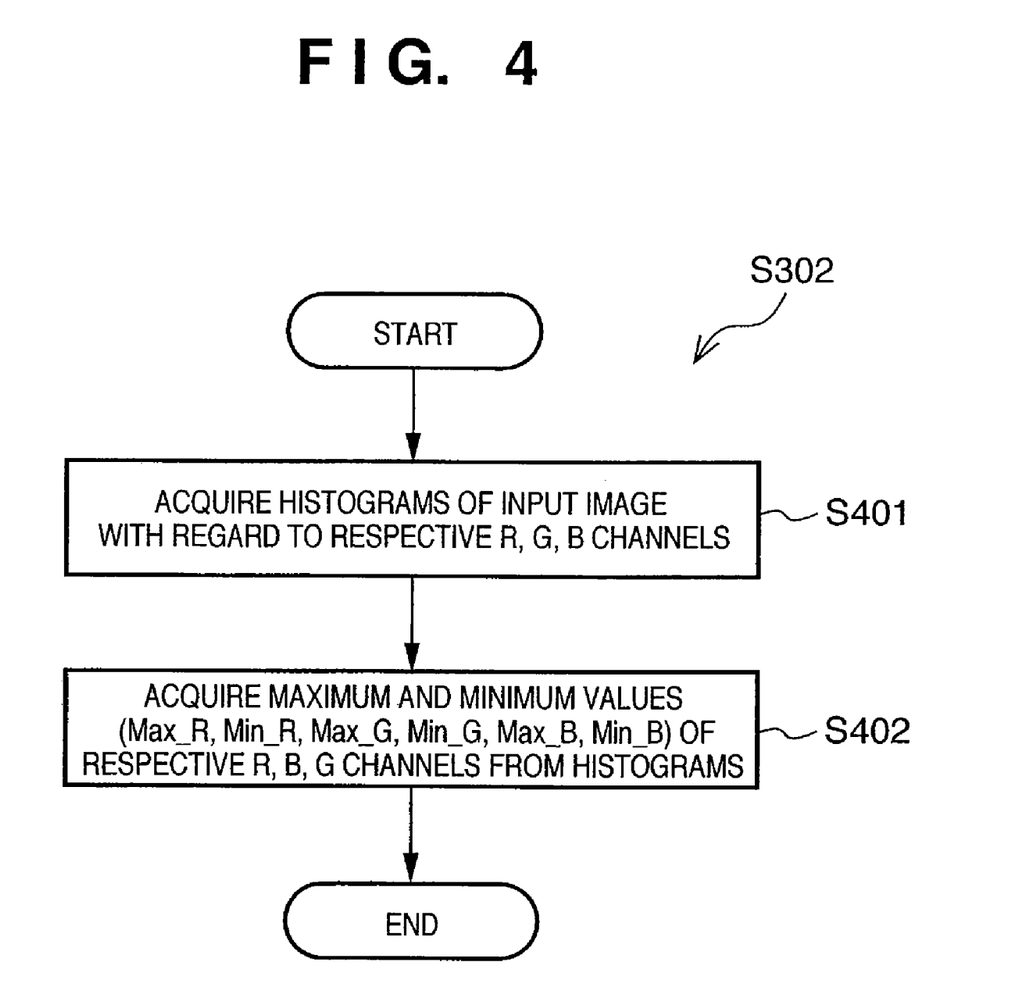
FIG. 4 is a flowchart useful in describing processing for acquiring a value range according to the first embodiment.

FIG. 4 is a flowchart useful in describing processing for acquiring a value range according to this embodiment. First, at step S401, the 3D-LUT initializing unit 22 acquires density histograms of the input image data, which has entered from the image input unit 21, with regard to the respective R, G, B, channels. Then, at step S402, the 3D-LUT initializing unit 22 analyses the histograms and acquires maximum and minimum values (Max_R, Min_R, Max_G, Min_G, Max_B, Min_B) of R, G, B, respectively, from the respective R, G, B density histograms.

A value range (Max_R, Min_R, Max_G, Min_G, Max_B, Min_B) of input image data can be acquired by the above-described processing. It should be noted that although a method of acquiring Max_R, Min_R, Max_G, Min_G, Max_B, Min_B from the respective R, G, B histograms of the input image data has been illustrated, the invention is not limited to this method. It goes without saying that as long as Max_R, Min_R, Max_G, Min_G, Max_B, Min_B of the input image data can be acquired, other methods may be used.

<Description of Processing for Setting Table Input Value Range>

Figure 5:
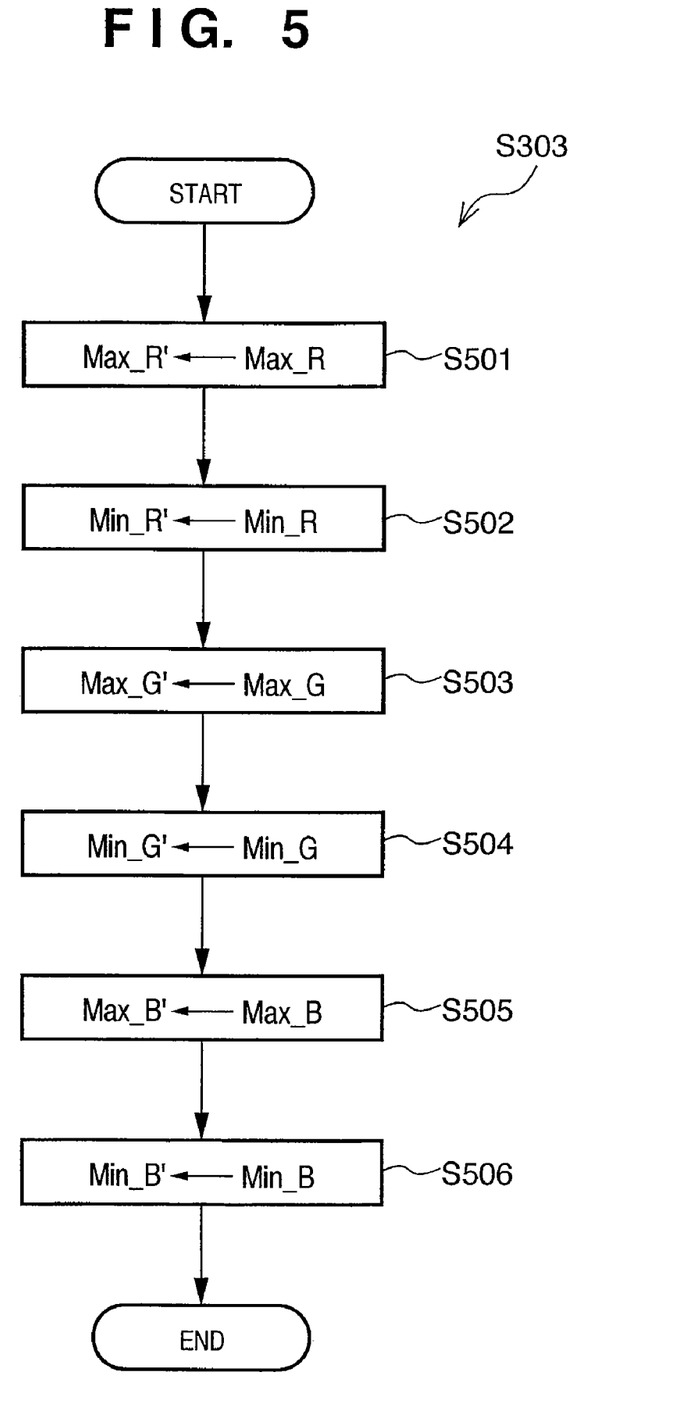
FIG. 5 is a flowchart useful in describing processing for setting a table-input value range according to the first embodiment.

Next, processing for setting the table input value range at step S303 will be described in detail with reference to the flowchart shown in FIG. 5. It should be noted that in the description that follows, the upper limits and lower limits of the input value ranges on the channels of each of the dimensions (RGB in this embodiment) of the 3D-LUT will be expressed by Max_R', Min_R', Max_G', Min_G', Max_B', Min_B'. Further, Max_R, Min_R, Max_G, Min_G, Max_B, Min_B represent the maximum and minimum values on the R, G, B channels, respectively, of the input image data obtained by the value-range acquisition processing described above.

In the processing for setting the table input value range according to the first embodiment, the 3D-LUT initializing unit 22 substitutes Max_R into Max_R' at step S501 and substitutes Min_R into Min_R' at step S502. Similarly, the 3D-LUT initializing unit 22 substitutes Max_G into Max_G' at step S503 and substitutes Min_G into Min_G' at step S504. The 3D-LUT initializing unit 22 substitutes Max_B into Max_B' at step S505 and substitutes Min_B into Min_B' at step S506.

By virtue of the processing described above, the input value range of the 3D-LUT can be made equal to the value range of the input image obtained by the above-described value-range acquisition processing. In other words, the input value range of the 3D-LUT can be limited to the value range of the input image data.

<Description of Processing for Initializing Grid Points>

Figure 6:
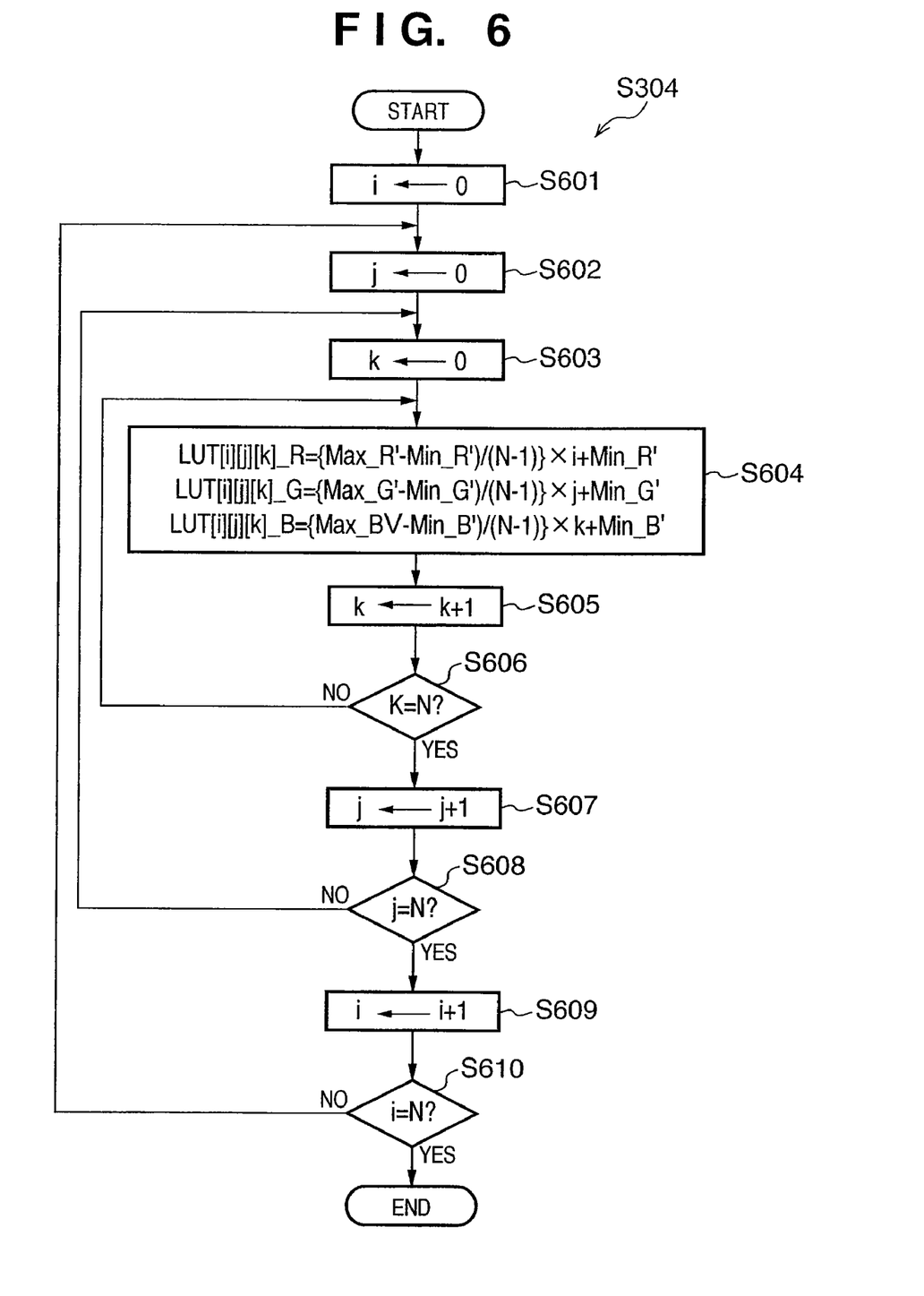
FIG. 6 is a flowchart useful in describing processing for initializing grid points according to the first embodiment.

The processing for initializing grid points at step S304 will now be described in detail with reference to the flowchart shown in FIG. 6. It should be noted that N represents the number of grid points on each of the R, G, B channels, LUT[i][j][k] represents each grid point of the 3D-LUT, and LUT[i][j][k]_R, LUT[i][j][k]_G, LUT[i][j][k]_B represent respective RGB values, which are the initial values of each grid point. Here i, j, k represent indices of grid points on each of the R, G, B channels and take on values of 0 to N−1. Further, Max_R', Min_R', Max_G', Min_G', Max_B', Min_B' represent upper and lower limits of input value ranges on the respective R, G, B channels of the 3D-LUT set by the above-described processing for setting the table input value range.

The 3D-LUT initializing unit 22 initializes the variable i at value 0 at step S601, initializes the variable j at value 0 at step S602 and initializes the variable k at value 0 at step S603. Then, at step S604, the 3D-LUT initializing unit 22 calculates the initial values of the grid points of the 3D-LUT in accordance with the following equations:

$$LUT[i][j][k]\_R = [(Max\_R' - Min\_R')/(N-1)] \times i + Min\_R'$$

$$LUT[i][j][k]\_G = [(Max\_G' - Min\_G')/(N-1)] \times j + Min\_G'$$

$$LUT[i][j][k]\_B = [(Max\_B' - Min\_B')/(N-1)] \times k + Min\_B'$$

The 3D-LUT initializing unit 22 increments the variable k by 1 at step S605 and compares k and N at step S606. If k and N are equal, control proceeds to step S607. If they are not equal, then control returns to step S604. The 3D-LUT initializing unit 22 increments the variable j by 1 at step S607 and compares j and N at step S608. If j and N are equal, control proceeds to step S609. If they are not equal, then control returns to step S603. The 3D-LUT initializing unit 22 increments the variable i by 1 at step S609 and compares i and N at step S610. If i and N are equal, the present processing is completed. If they are not equal, then control returns to step S602.

The output value at each grid point of the 3D-LUT can be initialized at an input value within the input value range of the 3D-LUT by the above-described processing. The initial values calculated at step S604 are set with regard to all $N^3$ LUT[i][j][k] in a range in which i, j, k range from 0 to N−1. Thus, the 3D-LUT initializing unit 22 generates an initial 3D-LUT and supplies it to the 3D-LUT generating unit 23.

Figure 7:
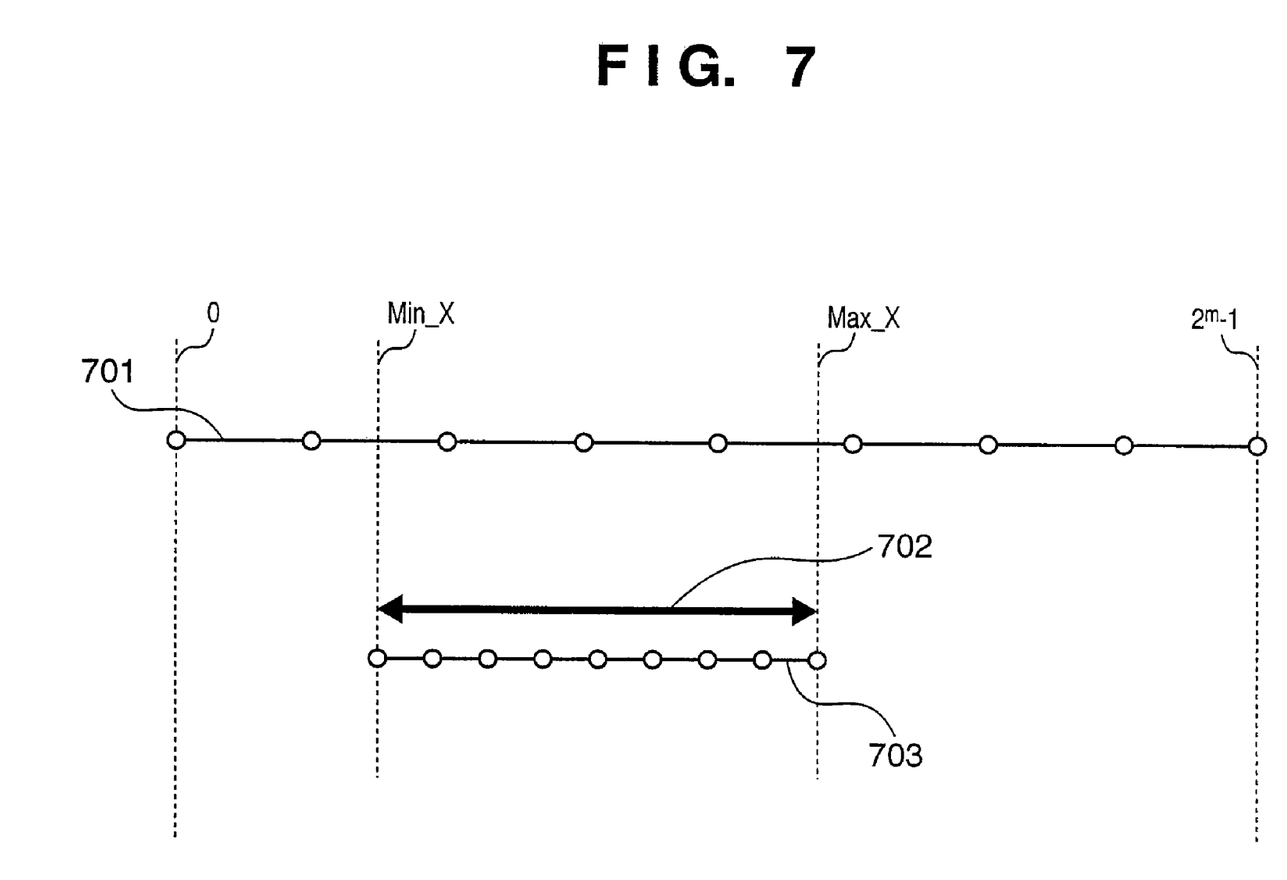
FIG. 7 is a schematic view useful in describing arrangement of grid points of an initial 3D-LUT according to the first embodiment.

FIG. 7 is a schematic view useful in describing arrangement of grid points of an initial 3D-LUT according to the first embodiment. FIG. 7 illustrates the arrangement of grid points in one dimension X of a 3D-LUT (e.g., in case of a 3D-LUT of RGB, the dimension is any one of R, G, B). If nine grid points are set by an ordinary technique in color space represented by m bits per dimension, the result will be as indicated at 701 in FIG. 7. On the other hand, if a value range 702 of input image data in the dimension X is acquired as Min_X to Max_X (step S402), then the minimum value Min_X' and maximum value Max_X' of the grid points in the X dimension are decided upon as Min_X and Max_X, respectively (FIG. 5). The nine grid points are arranged to the extent possible at an equal spacing within the range of the value range 702, as indicated at 703 in FIG. 7, whereby the initial 3D-LUT is generated.

Thus, in accordance with the first embodiment, an input value range in which the grid points of a 3D-LUT exist is set in accordance with the value range of the input image, and the 3D-LUT is generated. As a result, a 3D-LUT capable of implementing a highly accurate conversion without an increase in memory size is provided.

The 3D-LUT generating unit 23 incorporates one or a plurality of image processes (color conversion processing), which is for obtaining a desired output image, in an initial 3D-LUT generated as described above and generates the color-conversion 3D-LUT 26 in order to perform the desired color conversion.

Second Embodiment

In the first embodiment, grid points are arranged and set within the limits of the value range of the input image data of each channel of an initial 3D-LUT. However, with such a method of setting grid points, it is not possible to equalize the spacing of all grid points unless the size of the value range is a multiple of the spacing between grid points. Accordingly, in the second embodiment, the spacing between grid points can be equalized by applying processing, which is for extending the input value range, to the upper and lower limits (Max_R', Min_R', Max_G', Min_G', Max_B', Min_B') of the value range of each channel of the 3D-LUT set by the table input value range setting processing.

[Description of Processing for Extending Input Value Range]

Figure 8:
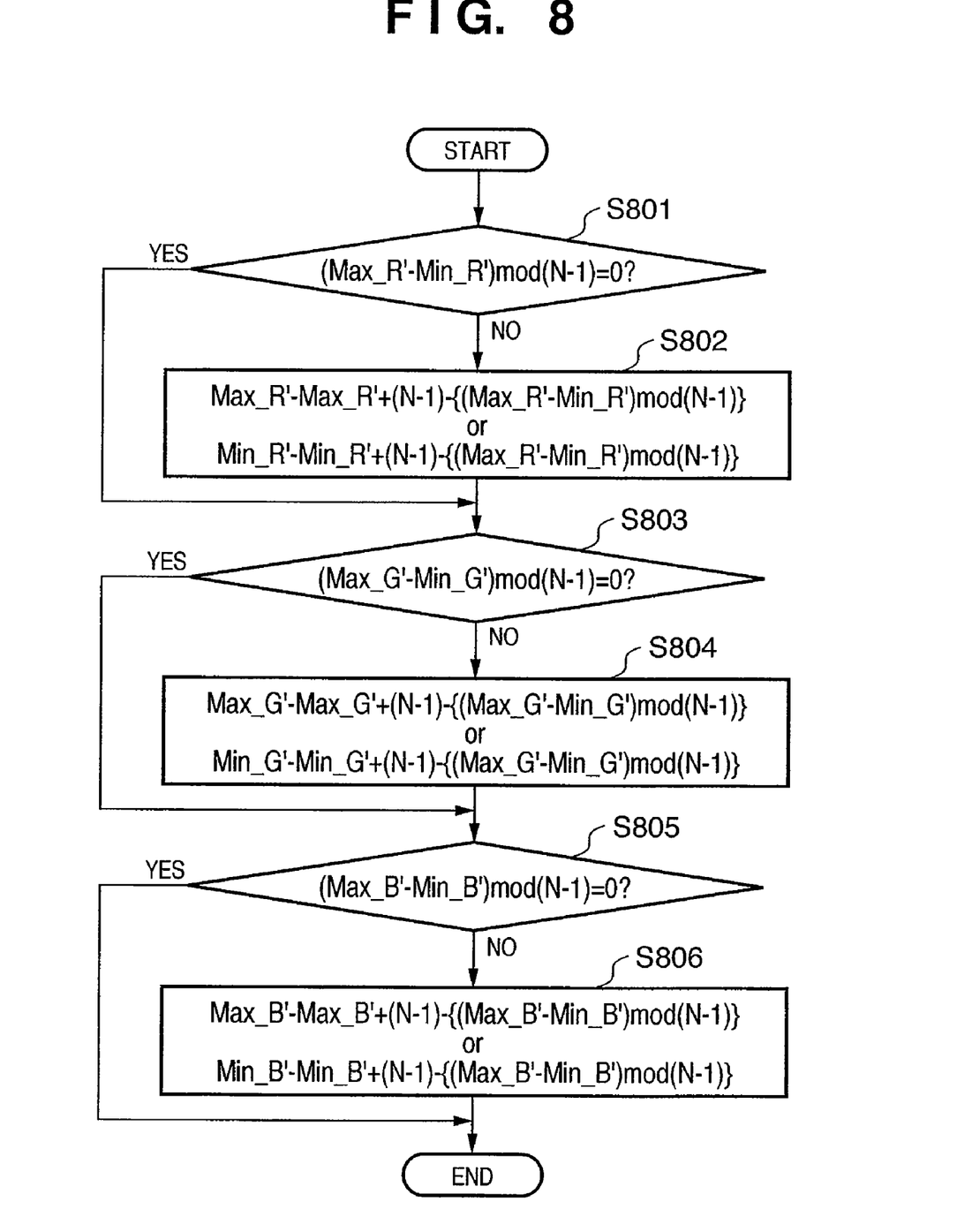
FIG. 8 is a flowchart useful in describing processing for extending an input value range according to a second embodiment of the present invention.

Processing for extending an input value range according to the second embodiment of the present invention will be described in detail with reference to the flowchart shown in FIG. 8. In the description that follows, N represents the number of grid points on each of the R, G, B channels, and Max_R', Min_R', Max_G', Min_G', Max_B', Min_B' represent upper and lower limits of value ranges on the respective R, G, B channels of the 3D-LUT.

It is determined at step S801 whether a remainder obtained by dividing (Max_R'−Min_R') by (N−1) is zero or not. If the remainder is zero, control proceeds to step S803; otherwise, control proceeds to step S802. Either Max_R' or Min_R' is changed at step S802 in accordance with one of the equations below, and processing for extending the input value range of the R channel is executed.

$$\text{Max\_}R' \leftarrow \text{Max\_}R' + (N-1) - [\text{Max\_}R' - \text{Min\_}R'] \bmod (N-1)]$$

or $$\text{Min\_}R' \leftarrow \text{Min\_}R + (N-1) - [\text{Max\_}R' - \text{Min\_}R'] \bmod (N-1)]$$

Next, at step S803, it is determined whether a remainder obtained by dividing (Max_G'–Min_G') by (N–1) is zero or not. If the remainder is zero, control proceeds to step S805; otherwise, control proceeds to step S804. Either Max_G' or Min_G' is changed at step S804 in accordance with one of the equations below, and processing for extending the input value range of the G channel is executed.

$$\text{Max\_}G' \leftarrow \text{Max\_}G' + (N-1) - [\text{Max\_}G' - \text{Min\_}G'] \bmod (N-1)]$$

or $$\text{Min\_}G' \leftarrow \text{Min\_}G' + (N-1) - [\text{Max\_}G' - \text{Min\_}G']]]]]]]] \bmod(N-1)]$$

Next, at step S805, it is determined whether a remainder obtained by dividing (Max_B'–Min_B') by (N–1) is zero or not. If the remainder is zero, this processing is exited; otherwise, control proceeds to step S806. Either Max_B' or Min_B'is changed at step S806 in accordance with one of the equations below, and processing for extending the input value range of the B channel is executed. This completes processing.

$$\text{Max\_}B' \leftarrow \text{Max\_}B' + (N-1) - [\text{Max\_}B' - \text{Min\_}B'] \bmod (N-1)]$$

or $$\text{Min\_}B' \leftarrow \text{Min\_}B' + (N-1) - [\text{Max\_}B' - \text{Min\_}B'] \bmod (N-1)]$$

As described with reference to FIG. 7, the above processing for extending the input value range decreases Min_X or increases Min_X in such a manner that the grid points can be arranged with an equal spacing with respect to the value range 702 of the data. In accordance with the second embodiment, the input value ranges of the respective R, G, B channels of the 3D-LUT are extended and rounding error in calculation when setting N grid points at an equal spacing or when looking up the 3D-LUT is reduced in comparison with the first embodiment. Further, although processing for revising either the maximum value or minimum value to extend the input value range has been illustrated, processing for revising both the maximum and minimum values to extend the input value range may of course be executed.

Third Embodiment

In the first and second embodiments, the value range of input image data is adopted as the input value range of a 3D-LUT by the processing (FIG. 5) for setting the table input value range. In a third embodiment, the minimum number of bits (m_R, m_G, m_B) capable of expressing the maximum value (Max_R, Max_G, Max_B) of input image data is acquired and a data range that can be expressed by the minimum number of bits (m_R, m_G, m_B) is set as the input value range of a 3D-LUT.

[Description of Table Input Value Range Setting Processing (FIG. 9)]

Figure 9:
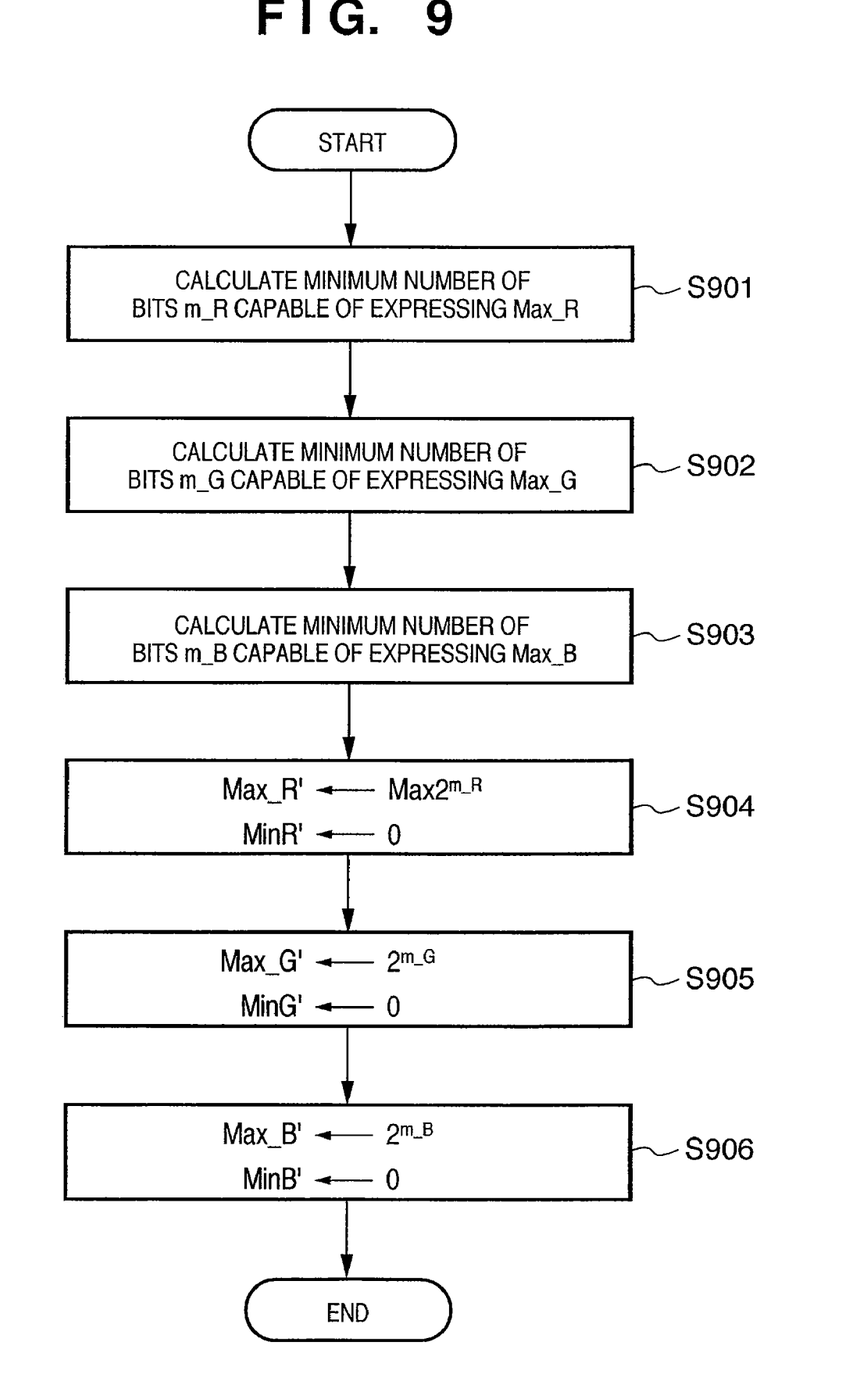
FIG. 9 is a flowchart useful in describing processing for setting a table-input value range according to a third embodiment of the present invention.

Processing for setting a table input value range according to the third embodiment will now be described with reference to the flowchart shown FIG. 9. Here maximum values of the R, G, B channels of input image data are expressed by Max_R, Max_G, Max_B, respectively, and the upper limits and lower limits of the value ranges on the R, G, B channels of a 3D-LUT are expressed by Max_R', Min_R', Max_G', Min_G', Max_B', Min_B', respectively.

The minimum number of bits m_R capable of expressing Max_R is calculated at step S901, the minimum number of bits m_G capable of expressing Max_G is calculated at step S902, and the minimum number of bits m_B capable of expressing Max_B is calculated at step S903. The minimum number of bits (m_R, m_G, m_B) capable of expressing the maximum value (Max_R, Max_G, Max_B) of input image data is thus acquired.

Next, at step S904, the 3D-LUT initializing unit 22 substitutes $2^{m\_R}$ into Max_R' and substitutes value 0 into Min_R'. Similarly, the 3D-LUT initializing unit 22 substitutes $2^{m\_G}$ into Max_G' and substitutes value 0 into Min_G'at step S905, and substitutes $2^{m\_B}$ into Max_B' and substitutes value 0 into Min_B' at step S906.

In accordance with the above-described processing, the minimum number of bits (m_R, m_G, m_B) capable of expressing the maximum value (Max_R, Max_G, Max_B) is calculated from the maximum value (Max_R, Max_G, Max_B) on each of the R, G, B channels of the input image data. As for the input value range of the 3D-LUT, 0 is set as the lower limits and 2m_R, 2m_G, 2m_B are set as the upper limits with regard to the respective R, G, B channels.

Figure 10:
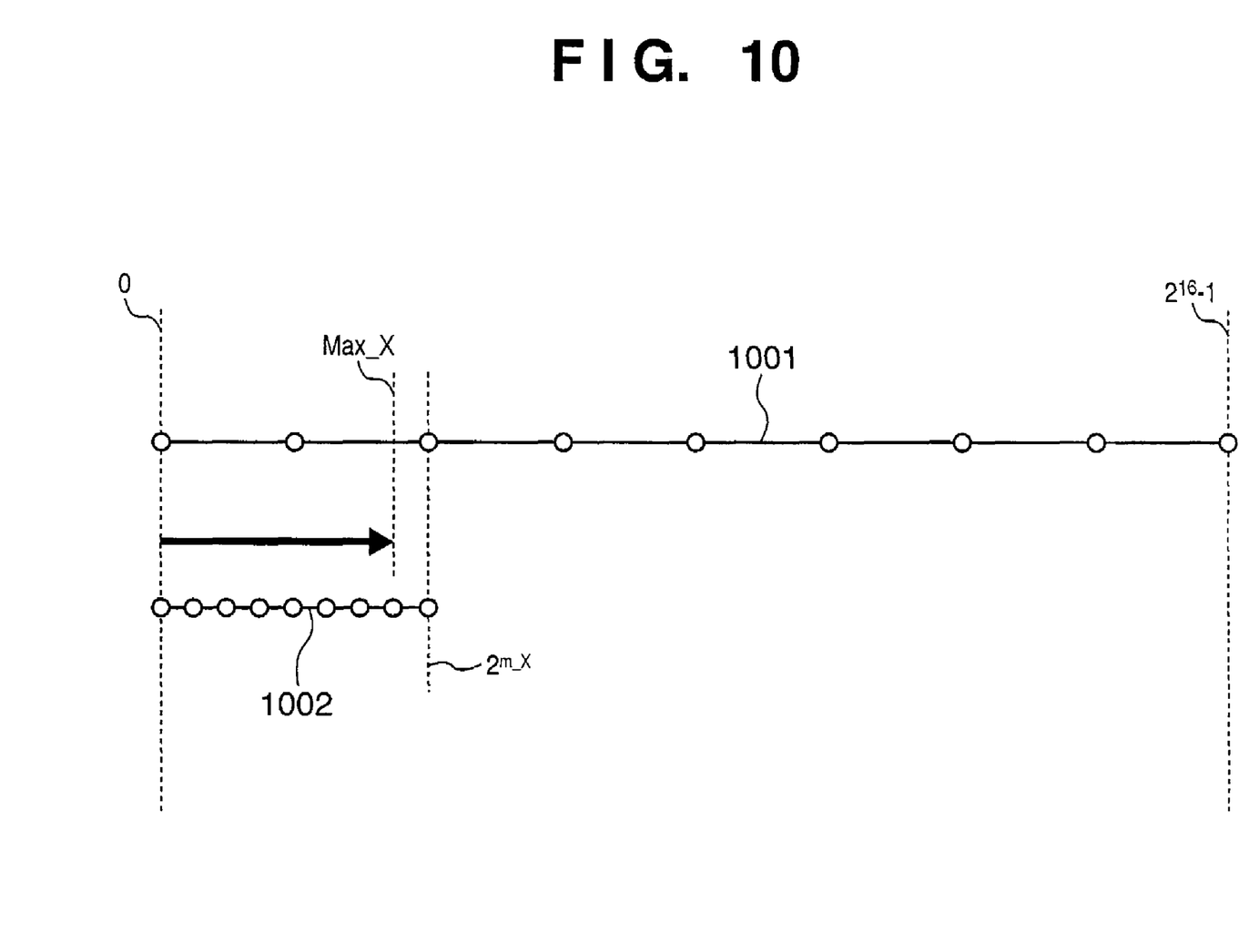
FIG. 10 is a schematic view useful in describing arrangement of grid points of an initial 3D-LUT according to the third embodiment.

FIG. 10 is a schematic view useful in describing arrangement of grid points of an initial 3D-LUT according to the third embodiment. FIG. 10 illustrates the arrangement of grid points in one dimension X of a 3D-LUT (e.g., in case of a 3D-LUT of RGB, the dimension is any one of R, G, B) If nine grid points are set by an ordinary technique in color space represented by 16 bits per dimension, the result will be as indicated at 1001 in FIG. 10. On the other hand, if the maximum value of the value range of the input image data in the dimension X is acquired as Max_X (step S402), then the minimum number of bits m_X capable of expressing this is calculated (steps S901 to S903). The minimum and maximum values of the grid points in the dimension X are decided upon as 0 and $2^{m\_X}$, respectively (steps S904 to S906). The nine grid points are arranged to the extent possible at an equal spacing within the value range 0 to $2^{m\_X}$, as indicated at 1002 in FIG. 10, whereby the initial 3D-LUT is generated.

In accordance with the 3D-LUT of the third embodiment described above, a bit-shift operation can be used in the image converting unit 24 in the course of calculation when the grid points of the 3D-LUT are detected from the input image data. In addition to the effects of the first embodiment, therefore, it is also possible to speed up processing.

Thus, in accordance with the first to third embodiments, the value range of input image data is acquired and the range of settings of the grid points of a 3D-LUT are limited to within the value range of the input image data, thereby initializing the grid points. As a result, a 3D-LUT capable of implementing a more accurate conversion can be generated even with a memory size the same as that used conventionally.

The present invention has been described with regard to a 3D-LUT corresponding to R, G, B in each of the foregoing embodiments. It is obvious that a look-up table generated through the procedure of the embodiments can be extended to an N-dimension look-up table, e.g., one that conforms to 4-dimension color space such as CMYG.

Other Embodiments

Although an embodiment has been described above in detail, it is possible for the present invention to take on the form of a system, apparatus, method, program or storage medium. More specifically, the present invention may be applied to a system constituted by a plurality of devices or to an apparatus comprising a single device.

Furthermore, there are cases where the object of the invention is attained also by supplying a software program directly or remotely to a system or apparatus, reading the supplied program codes with a computer of the system or apparatus, and then executing the program codes. In this case, the program supplied is a program corresponding to the flowcharts illustrated in the drawings of the embodiments.

Accordingly, since the functional processing of the present invention is implemented by computer, the program codes per se installed in the computer also implement the present invention. In other words, the present invention also covers a computer program that is for the purpose of implementing the functional processing of the present invention.

In this case, so long as the system or apparatus has the functions of the program, the form of the program, e.g., object code, a program executed by an interpreter or script data supplied to an operating system, etc., does not matter.

Examples of recording media for supplying the program are a floppy (registered trademark) disk, hard disk, optical disk, magneto-optical disk, CD-ROM, CD-R, CD-RW, magnetic tape, non-volatile-type memory card, ROM, DVD (DVD-ROM, DVD-R), etc.

As for the method of supplying the program, a client computer can be connected to a website on the Internet using a browser possessed by the client computer, and the computer program per se of the present invention can be downloaded to a recording medium such as a hard disk. In this case, the program downloaded may be a file that is compressed and contains an automatic installation function. Further, implementation is possible by dividing the program codes constituting the program of the present invention into a plurality of files and downloading the files from different websites. In other words, a WWW server that downloads, to multiple users, the program files that implement the functional processing of the present invention by computer also is covered by the scope of the present invention.

Further, it is also possible to encrypt and store the program of the present invention on a storage medium such as a CD-ROM and distribute the storage medium to users. In this case, users who meet certain requirements are allowed to download decryption key information from a website via the Internet, the program decrypted using this key information can be executed and the program can be installed on a computer.

Further, besides implementing the functions of the embodiments by executing a read program using a computer, the functions of the embodiments may be implemented in cooperation with an operating system running on a computer, based upon commands from the program. In this case, the operating system, etc., executes some or all of the functions of actual processing and the functions of the above-described embodiments are implemented by this processing.

Furthermore, a program that has been read from a recording medium may be written to a memory provided on a function expansion board inserted into the computer or provided in a function expansion unit connected to the computer, and some or all of the functions of the embodiments may be implemented. In this case, after the program has been written to the function expansion board or function expansion unit, a CPU or the like provided on the function expansion board or function expansion unit performs some or all of the actual processing based upon the indications in the program.

In accordance with the present invention, the input value range of an N-dimension look-up table is set based upon the value range of input image data. This makes possible the provision of an N-dimension look-up table that is capable of implementing a more accurate conversion without an increase in memory size.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-063145, filed Mar. 8, 2006, which is hereby incorporated by reference herein in its entirety.

What is claimed is:

1. An information processing method for generating an N-dimension look-up table ($N \geq 2$) used in conversion processing of input image data which has a first value range, comprising:
    an acquiring step of acquiring a second value range of the input image data within the first value range for every channel corresponding to a respective dimension of the N-dimension look-up table by analyzing the input image data to be processed;
    a determining step of determining with a processor an input value range of each dimension of the N-dimension look-up table based upon the second value range acquired at said acquiring step;
    an arranging step of arranging with a processor a grid width of a predetermined number of grid points in the input value range determined at said determining step with regard to each dimension of the N-dimension look-up table; and
    a setting step of setting with a processor an output value of each grid point, which has been arranged at said arranging step, based upon image processing to be executed.

2. The method according to claim 1, wherein said acquiring step acquires, for the second value range, a maximum value and minimum value for every channel corresponding to a respective dimension of the input image data; and
    said determining step decides upon the maximum value and the minimum value, which have been acquired at said acquisition step, as a maximum value and a minimum value of the input value range on a per-dimension basis.

3. The method according to claim 1, wherein said determining step determines the maximum value and minimum value of the input value range on a per-dimension basis by extending the value acquired at said acquiring step, in such a manner that the predetermined number of grid points can be arranged at an equal spacing within the input value range.

4. The method according to claim 1, wherein said acquiring step acquires a maximum value of the input image data for the second value range, for every channel corresponding to a respective dimension of the N-dimension look-up table; and
    said determining step determines a data range, which is capable of being expressed by a minimum number of bits that can express the maximum value that has been acquired at said acquiring step, as the input value range, for every dimension of the N-dimension look-up table.

5. An image processing method comprising:
a step of generating an N-dimension look-up table by the information processing method set forth in claim 1; and
a table referring step of converting the input image data by the N-dimension look-up table in which output values have been set at said setting step, and obtaining output image data.

6. An information processing apparatus for generating an N-dimension look-up table (N≧2) used in conversion processing of input image data which has a first value range, comprising:
an acquiring unit adapted to acquire a second value range of the input image data within the first value range for every channel corresponding to a respective dimension of the N-dimension look-up table by analyzing the input image data to be processed;
a determining unit adapted to determine an input value range of each dimension of the N-dimension look-up table based upon the second value range acquired by said acquiring unit;
an arranging unit adapted to arrange a grid width of a predetermined number of grid points in the input value range determined by said determining unit with regard to each dimension of the N-dimension look-up table; and
a setting unit adapted to set an output value of each grid point, which has been arranged by said arranging unit, based upon image processing to be executed.

7. The apparatus according to claim 6, wherein said acquiring unit acquires, for the second value range, a maximum value and minimum value for every channel corresponding to a respective dimension of the input image data; and
said determining unit decides upon the maximum value and the minimum value, which have been acquired by said acquisition unit, as a maximum value and a minimum value of the input value range on a per-dimension basis.

8. The apparatus according to claim 6, wherein said determining unit determines the maximum value and minimum value of the input value range on a per-dimension basis by extending the value acquired by said acquiring unit, in such a manner that the predetermined number of grid points can be arranged at an equal spacing within the input value range.

9. The apparatus according to claim 6, wherein said acquiring unit acquires a maximum value of the input image data for the second value range, for every channel corresponding to a respective dimension of the N-dimension look-up table; and
said determining unit determines a data range, which is capable of being expressed by a minimum number of bits that can express the maximum value that has been acquired by said acquiring unit, as the input value range, for every dimension of the N-dimension look-up table.

10. An image processing apparatus comprising:
a unit adapted to generate an N-dimension look-up table (N≧2) by executing the information processing method set forth in claim 1; and
a table referring unit adapted to convert the input image data by the N-dimension look-up table in which output values have been set at said setting step, and obtaining output image data.

11. A computer-readable medium storing a control program for causing a computer to execute the method set forth in claim 1.

* * * * *